United States Patent
Fan et al.

(10) Patent No.: US 11,569,854 B1
(45) Date of Patent: Jan. 31, 2023

(54) RF RECEIVER AND METHOD FOR SIMULTANEOUSLY COMPENSATING CARRIER FREQUENCY OFFSET AND OPTIMIZING BANDWIDTH BY USING PREAMBLE OF A RECEIVED RF SIGNAL

(71) Applicant: Uniband Electronic Corp., Hsin-Chu (TW)

(72) Inventors: Yiping Fan, Hsinchu (TW); Li-Feng Chen, Hsinchu (TW)

(73) Assignee: Uniband Electronic Corp., Hsin-Chu (TW)

( * ) Notice: Subject to any disclaimer, the term of this patent is extended or adjusted under 35 U.S.C. 154(b) by 0 days.

(21) Appl. No.: 17/666,567

(22) Filed: Feb. 8, 2022

(51) Int. Cl.
*H04B 1/12* (2006.01)

(52) U.S. Cl.
CPC .................................. *H04B 1/123* (2013.01)

(58) Field of Classification Search
CPC .......... H04B 1/123; H04B 1/12; H04B 1/109; H04B 1/1081; H04B 1/06; H04B 2201/709709
See application file for complete search history.

(56) References Cited

U.S. PATENT DOCUMENTS

| | | | |
|---|---|---|---|
| 5,553,081 A * | 9/1996 | Downey | H04B 3/54 340/310.14 |
| 5,970,105 A | 10/1999 | Dacus | |
| 8,886,149 B2 | 11/2014 | Haub | |
| 9,231,810 B2 | 1/2016 | Wu | |
| 10,939,497 B2 | 3/2021 | Pera | |
| 2002/0154620 A1* | 10/2002 | Azenkot | H04L 27/0008 370/347 |
| 2018/0184390 A1* | 6/2018 | Wu | H04W 56/0005 |

* cited by examiner

*Primary Examiner* — Khanh C Tran
(74) *Attorney, Agent, or Firm* — Winston Hsu

(57) ABSTRACT

A radio frequency (RF) receiver has an antenna, a low-noise amplifier, a sigma-delta frequency synthesizer/voltage-controlled oscillator (VCO), an in-phase and quadrature (I/Q) mixer, a channel filter, and a digital baseband circuit. The digital baseband circuit has a demodulator, a preamble detection and carrier frequency offset (CFO) estimation circuit, and a CFO to sigma-delta modulation (SDM) input mapper. A preamble field of a digital demodulated signal generated by the demodulator is detected by the preamble detection and CFO estimation circuit. The RF receiver simultaneously compensates its CFO and optimizes a bandwidth of the channel filter based on the detection of the preamble field of the digital demodulated signal by the preamble detection and CFO estimation circuit.

13 Claims, 7 Drawing Sheets

RF RECEIVER AND METHOD FOR
SIMULTANEOUSLY COMPENSATING
CARRIER FREQUENCY OFFSET AND
OPTIMIZING BANDWIDTH BY USING
PREAMBLE OF A RECEIVED RF SIGNAL

BACKGROUND OF THE INVENTION

1. Field of the Invention

The present invention is related to a radio receiver and a method for compensating a radio frequency (RF) carrier frequency offset (CFO) and optimizing bandwidth of the receiver, and more particularly to a receiver and a method for correcting the frequency offset and optimizing the bandwidth of receiving filters of the receiver to compensate the CFO according to the preamble field of the received RF signal.

2. Description of the Prior Art

In radio frequency (RF) communication systems, an RF carrier frequency is generated by one or more local oscillators, which are often locked to a stable crystal reference clock. However, due to variations of manufacturing process and material, and aging of crystal, the frequencies of the reference clocks at a transmitter and a receiver are not exactly the same. The frequency difference in the reference clocks causes an RF carrier frequency offset (CFO) between the transmitter and the receiver. This frequency offset makes the receiver degrade its performance and even can't receive RF data correctly if the frequency offset is big enough. So limiting this frequency offset is very critical to ensure reliable RF communication. One approach to overcome the problem is to use an accurate crystal with good aging property. However, it means more cost for the targeted communication system.

In digital communication systems, signal to noise ratio (SNR) is the most important factor for a reliable communication. One can improve SNR either by increasing signal power and/or reducing noise power. The noise power is determined by the noise figure and the noise bandwidth of the receiver. The noise bandwidth is set by channel filter of the receiver, which can be implemented by analog circuit only or analog/digital hybrid circuit. Therefore, in order to reduce the noise power in a receiver, one can narrow the bandwidth of the filter. However, this approach of narrowing bandwidth may also cause power loss of the received signal, and even cause the distortion of the wanted signal. So a balanced selection of the filter bandwidth is the key to achieve the maximum signal to noise and distortion ratio (SNDR). However, if the filter bandwidth is not large enough to accommodate the CFO, the CFO will cause the signal to partially or completely move outside of the filter bandwidth. Therefore, there is a dilemma to maximize SNDR and tolerate the frequency offset in the prior art.

SUMMARY OF THE INVENTION

An embodiment of the present invention provides a method for compensating the carrier frequency offset (CFO) of a RF receiver. The method comprises receiving a RF signal; a sigma-delta frequency synthesizer/voltage-controlled oscillator (VCO) of the RF receiver providing a local oscillator (LO) frequency signal; an in-phase and quadrature (I/Q) mixer of the RF receiver generating a pair of I/Q signals based on the received RF signal and the LO frequency signal; a channel filter of the RF receiver is initialized with an initial bandwidth and filtering the pair of I/Q signals to generate a pair of filtered I/Q signals; a set of variable-gain amplifiers (VGAs) and analog-to-digital converters (ADCs) amplify and convert the pair of filtered I/Q signals to a pair of digital I/Q signals.

When the RF receiver is a low inter-media frequency (low-IF) receiver, the I/Q mixer converts the received RF signal to a pair of low-IF I/Q signals, then the band-pass type channel filter, VGAs, and ADCs filter, amplify, convert the pair of the low-IF I/Q signals to generate a pair of digital low-IF I/Q signals. In the digital baseband circuit, a down-converter converts the pair of the low-IF I/Q signals to a pair of baseband I/Q signals, and a low-pass filter filters the pair of the low-IF I/Q signals to generate a pair of filtered baseband I/Q signals. A demodulator demodulates the pair of filtered baseband I/Q signals to generate a demodulated signal, a preamble detection and CFO estimation circuit detects the preamble field of the digital demodulated signal and calculates the CFO value of the preamble field. A CFO to sigma-delta modulation (SDM) input mapper converts the CFO value into a sigma-delta input value and narrows the bandwidth of the channel filter and the bandwidth of the digital low-pass filter at the same time according to the preamble detected event. The sigma-delta frequency synthesizer/VCO adjusts the frequency of the LO frequency signal according to the sigma-delta input value.

When the RF receiver is a zero inter-media frequency (zero-IF) receiver, the signal flow and the block diagram are similar to those of the low-IF receiver, but the channel filter of the zero-IF receiver is a low-pass type filter, and the down-convert is unnecessary.

These and other objectives of the present invention will no doubt become obvious to those of ordinary skill in the art after reading the following detailed description of the preferred embodiment that is illustrated in the various figures and drawings.

DETAILED DESCRIPTION

Instead of limiting the frequency of the crystal oscillator, the present invention provides a novel approach to compensate the frequency offset at the receiver side by using both Sigma-Delta frequency synthesizer/voltage-controlled oscillator (VCO), and frequency offset estimation with an adaptive filter bandwidth. In digital communication systems, data are transmitted in packets. The received package typically consists of fields of preamble, header and payload. The preamble identifies the signal itself, and the header identifies the boundary of the payload data. Typically, preamble and header require much less SNR to correctly identify themselves than the required SNR to decode the payload data.

The present invention provides a novel approach for cleverly exploiting this feature to compensate the frequency offset and to reach the maximum SNR at the same time. The following is the concept of compensating the frequency offset and optimizing the channel bandwidth. When the receiver is turned on, the channel filter bandwidth is set to a value that can cover the specified maximum frequency offset. The receiver estimates the frequency offset via the preamble of the data package of the received signal. Then, the receiver compensates the frequency offset via Sigma-Delta frequency synthesizer/VCO and switches the channel bandwidth to a lower value, which corresponds to an optimized noise bandwidth. After that, the receiver resynchronizes the bit order of the preamble and decodes the package accordingly.

Figure 1:
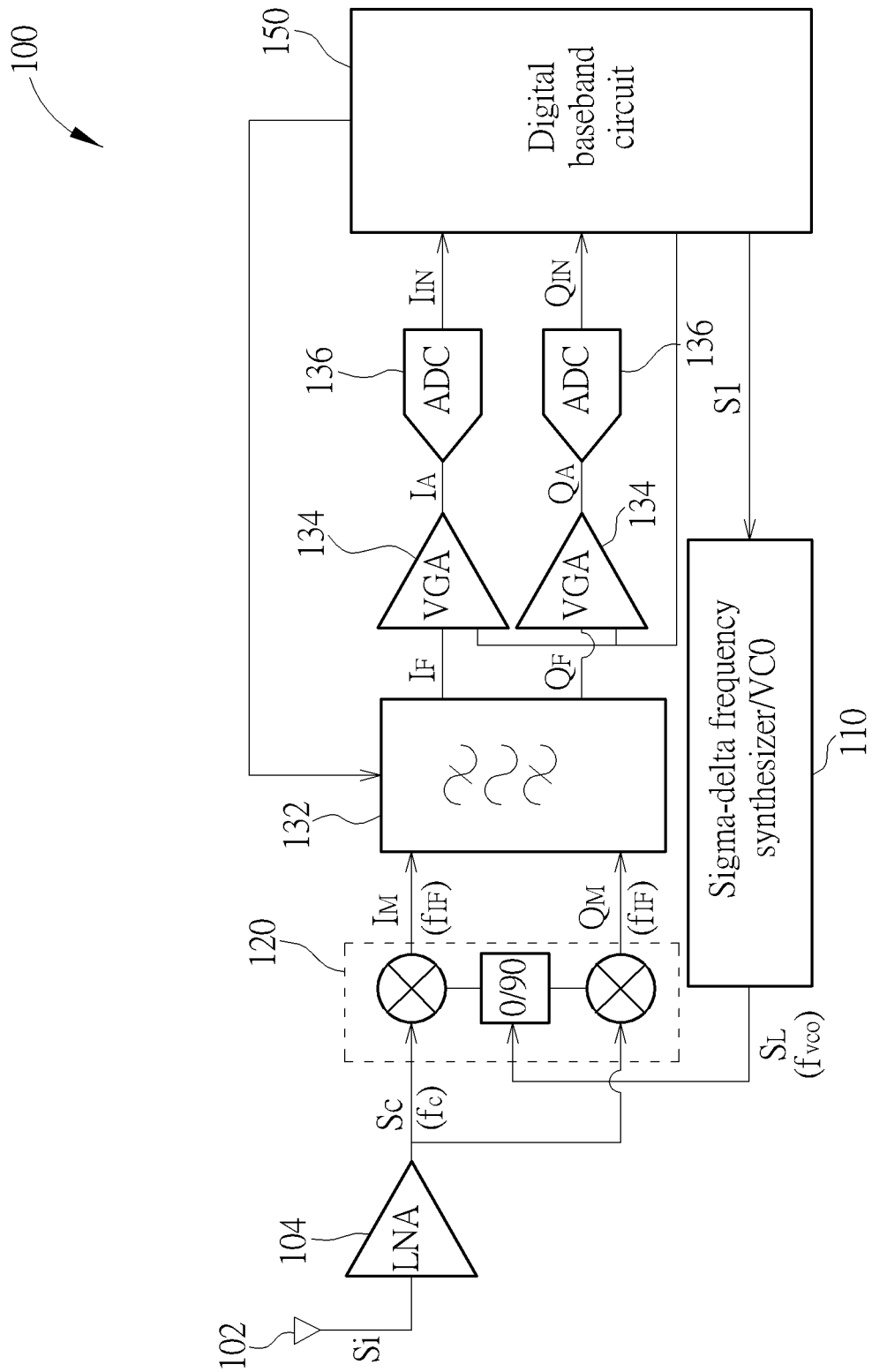
FIG. 1 is a functional block diagram of a radio frequency (RF) receiver according to an embodiment of the present invention.

As shown in FIG. 1, the radio frequency (RF) receiver 100 comprises an antenna 102, a low-noise amplifier (LNA) 104, a sigma-delta frequency synthesizer/voltage-controlled oscillator (VCO) 110, an in-phase and quadrature (I/Q) mixer 120, a channel filter 132, a pair of variable-gain amplifiers (VGAs) 134, a pair of analog-to-digital converters (ADCs) 136, and a digital baseband circuit 150. The antenna 102 receives a RF signal Si, and the LNA 104 amplifies the received RF signal Si to generate the amplified RF signal Sc. The sigma-delta frequency synthesizer/VCO 110 is configured to provide a local oscillator (LO) frequency signal $S_L$ with an adjustable VCO frequency $f_{VCO}$. The I/Q mixer 120 is configured to generate a pair of I/Q signals $I_M$ and $Q_M$, which have a frequency $f_{IF}$, based on the amplified RF signal Sc and the LO frequency signal $S_L$. In addition, the channel filter 132 is configured to filter the pair of I/Q signals $I_M$, $Q_M$ to generate a pair of filtered I/Q signals $I_F$ and $Q_F$. Then the following VGAs 134 and ADCs 136 will amplify and transfer the pair of the filtered signals $I_F$ and $Q_F$ to generate a pair of digital signals $I_{IN}$ and $Q_{IN}$ then pass the pair of digital signals $I_{IN}$ and $Q_{IN}$ to the digital baseband circuit 150. In detail, the I/Q VGAs 134 amplify the pair of the filtered I/Q signals to generate a pair of amplified I/Q signals $I_A$ and $Q_A$, and the I/Q ADCs 136 convert the pair of the amplified I/Q signals $I_A$ and $Q_A$ to generate the pair of digital I/Q signals $I_{IN}$ and $Q_{IN}$.

Figure 2:
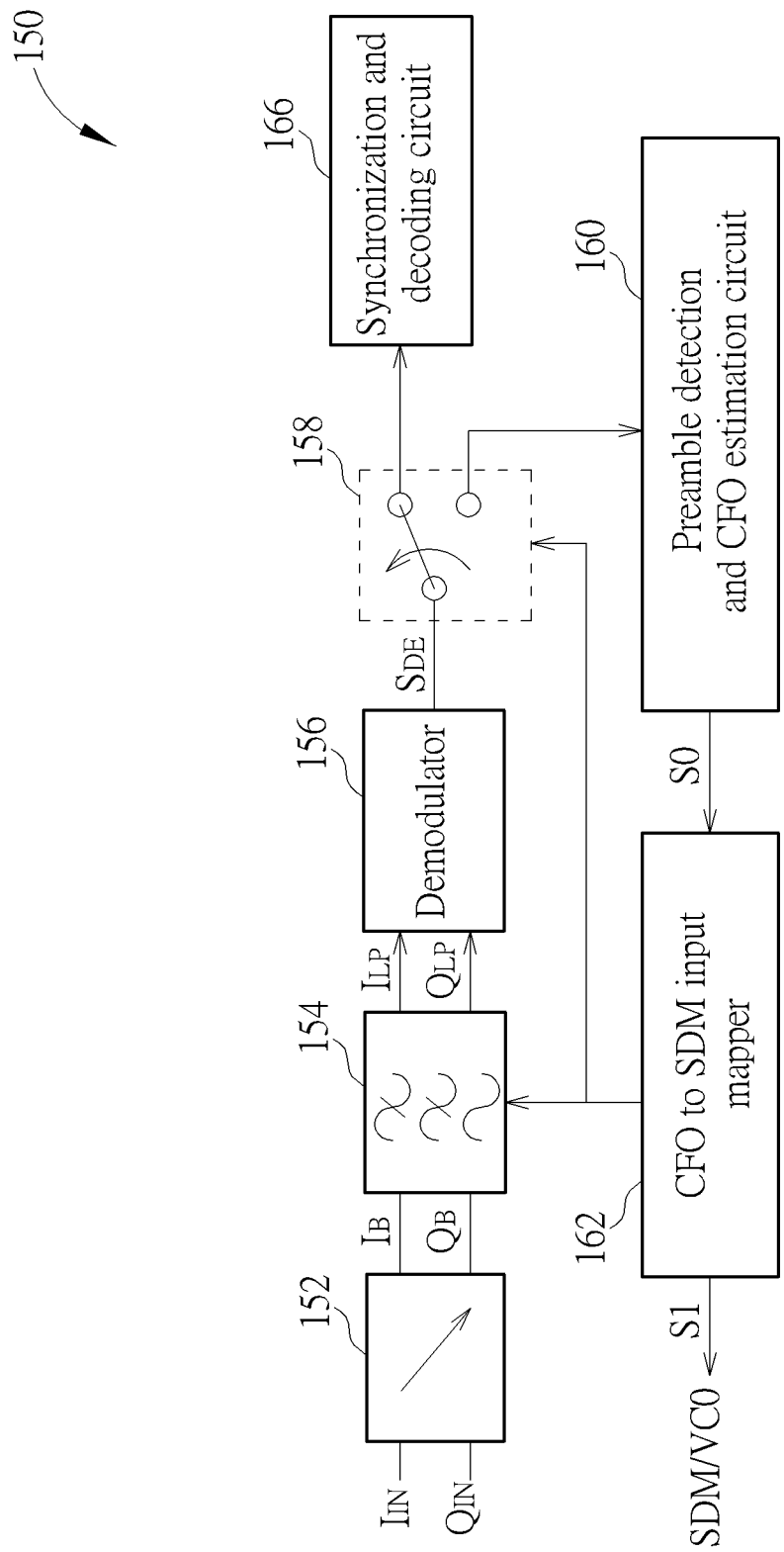
FIG. 2 is a functional block diagram of a digital baseband circuit of the RF receiver in FIG. 1.

As shown in FIG. 2, the digital baseband circuit 150 comprises a down converter 152, a digital low-pass filter 154, a demodulator 156, a data-path switch 158, a preamble detection and CFO estimation circuit 160, a CFO to sigma-delta modulation (SDM) input mapper 162, and a synchronization and decoding circuit 166. The down-converter 152 is configured to convert the pair of the digital I/Q signals $I_{IN}$ and $Q_{IN}$ to a pair of baseband I/Q signals $I_B$ and $Q_B$. The digital low-pass filter 154 is configured to filter the pair of the baseband I/Q signals $I_B$ and $Q_B$ to generate a pair of filtered baseband signals $I_{LP}$ and $Q_{LP}$. The demodulator 156 is configured to demodulate the pair of filtered baseband signals $I_{LP}$ and $Q_L$ to generate a digital demodulated signal $S_{DE}$. The data-path switch 158 is initially coupled to the preamble detection and CFO estimation circuit 160, and the preamble detection and CFO estimation circuit 160 would detect the preamble field of the digital demodulated signal $S_{DE}$, calculate a CFO value S0 of the preamble field, and pass the CFO value S0 to the CFO to SDM input mapper 162. The CFO to SDM input mapper 162 would convert the CFO value S0 into a sigma-delta input value S1, and narrow the bandwidth of the channel filter 132 and the bandwidth of the digital low-pass filter 154 simultaneously based on the detection of the preamble field by the preamble detection and CFO estimation circuit 160 (e.g., according to the CFO value S0). In addition, the CFO to SDM input mapper 162 would re-reset the sigma-delta frequency synthesizer/VCO 110 so that the sigma-delta frequency synthesizer/VCO 110 would adjust the frequency $f_{VCO}$ of the LO frequency signal $S_L$ according to the sigma-delta input value S1. The sigma-delta frequency synthesizer/VCO 110 is pre-reset before the sigma-delta input value S1 is passed to the sigma-delta frequency synthesizer/VCO 110.

When the CFO compensation for the RF receiver 100 is completed, the bandwidth of the channel filter 132 is optimized for the RF signal Sc. Meanwhile, the CFO to SDM input mapper 162 switches the data-path switch 158 to pass the digital demodulated signal $S_{DE}$ to the synchronization and decoding circuit 166, and the synchronization and decoding circuit 166 would align the bit-order of the preamble field of the digital demodulated signal $S_{DE}$ and decode the data bits of the header field and the payload field of the digital demodulated signal $S_{DE}$ to output data contained in the received RF signal Si. The foresaid CFO compensation for the RF receiver 100 is usually completed before receiving the data bits of the payload field of the digital demodulated signal $S_{DE}$.

Due to the duration of the preamble field of the digital demodulated signal $S_{DE}$ is predetermined and usually multiple times the processing time of the preamble detection and CFO estimation at a time, thus the CFO estimation can be executed multiple times in the period of the preamble field, then the estimation of the CFO value S0 can be iterated multiple times to achieve a more reliable and accurate CFO estimation for the RF receiver 100. With each iteration of the estimation of the CFO value S0, the bandwidth of the channel filter 132 is reduced to achieve a better SNR value. In an embodiment, the RF receiver 100 may further comprise a count for counting backwards the remaining iteration(s) of the CFO estimation to be processed by the preamble detection and CFO estimation circuit 160. Each time the CFO estimation is processed by the preamble detection and CFO estimation circuit 160, the remaining iteration count is decreased by 1. The CFO estimation would be repeated until the remaining iteration count is run-out, and the remaining iteration count would be run-out before the data-path switch 158 passes the digital demodulated signal $S_{DE}$ to the synchronization and decoding circuit 166.

For the communication systems using frequency modulation schemes, such as minimum-shift keying (MSK), Gauss frequency shift keying (GFSK), frequency shift keying (FSK) and similar modulations, the CFO effect is proportional to the offset of signals outputted from the demodulator of the RF receiver when a phase differential demodulator is used. For example, in IEEE802.15.4g MR-FSK mode, the bit-data in the preamble field is [0, 1] repeatedly, then the mean calculation for preamble field of demodulated signal could be zero for no CFO effect cases. Considering with the CFO effect in the demodulated signal $S_{DE}$, the mean calculation for preamble field would result a offset value mapping to a specified CFO value.

In the embodiment, the RF receiver 100 may be a low inter-media frequency (low-IF) receiver, the channel filter 132 is a band-pass type filter, and the digital low-pass filter 154 is a digital low-pass filter. In another embodiment, the RF receiver 100 may be a zero inter-media frequency (zero-IF) receiver, the channel filter 132 is a low-pass filter, the down-converter 152 is unnecessary, and the digital low-pass filter 154 is an optional component if the performance budget of the RF receiver 100 is not critical.

Figure 3:
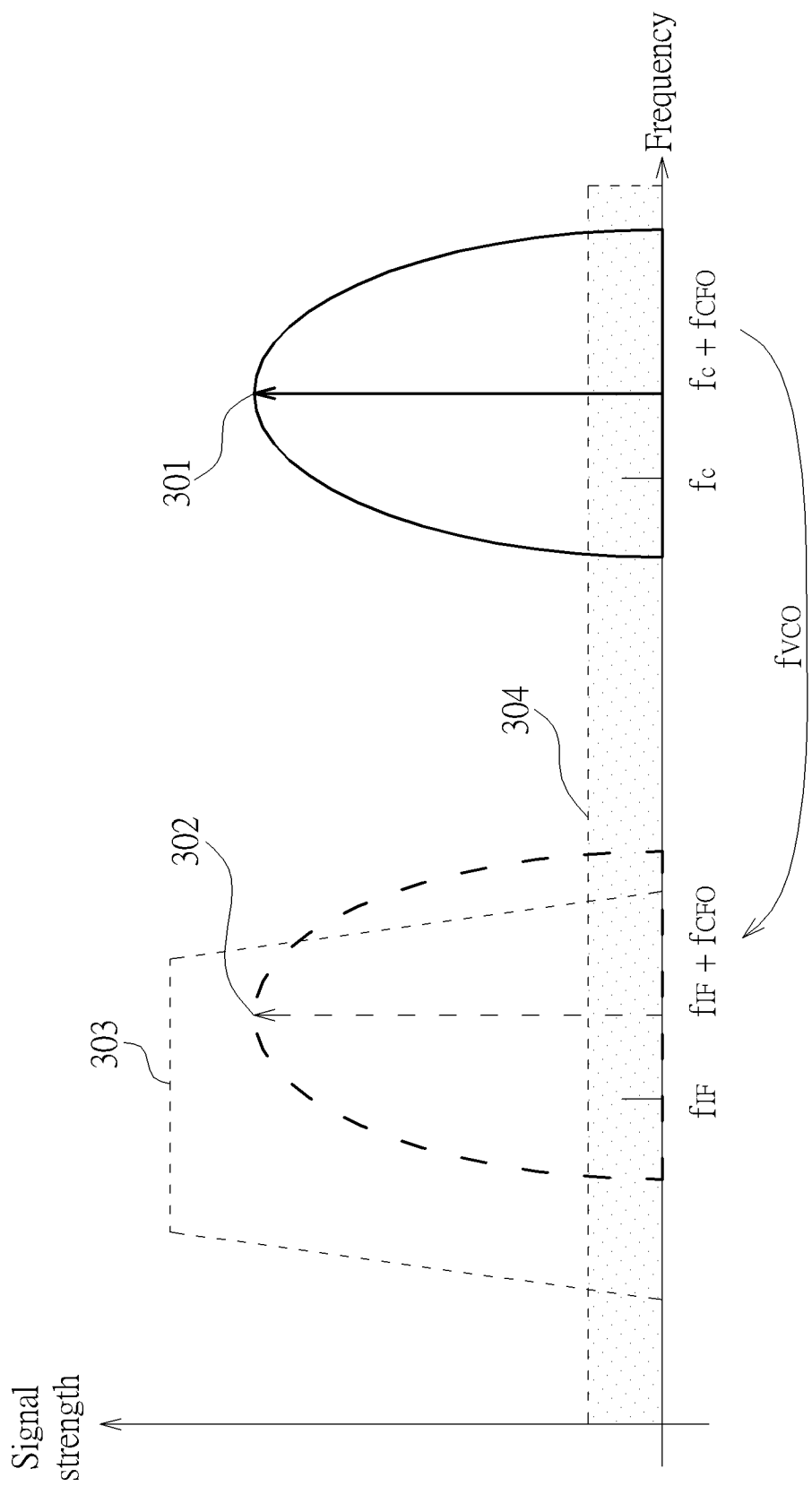
FIG. 3 shows a frequency response of the channel filter in FIG. 1 with a narrow bandwidth under carrier frequency offset (CFO) effect.
Figure 4:
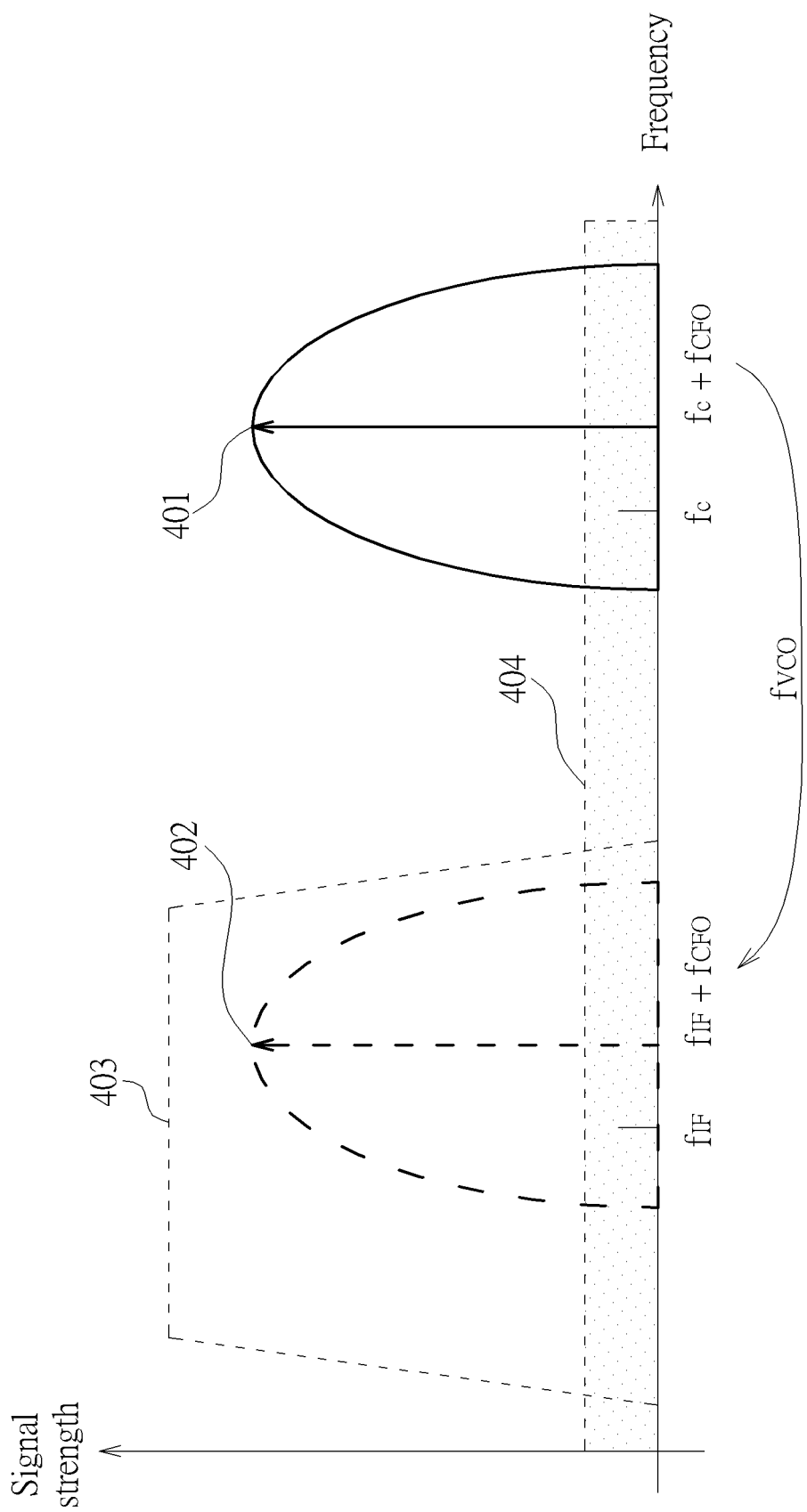
FIG. 4 shows a frequency response of the channel filter in FIG. 1 with a wide adjusted bandwidth under CFO effect.
Figure 5:
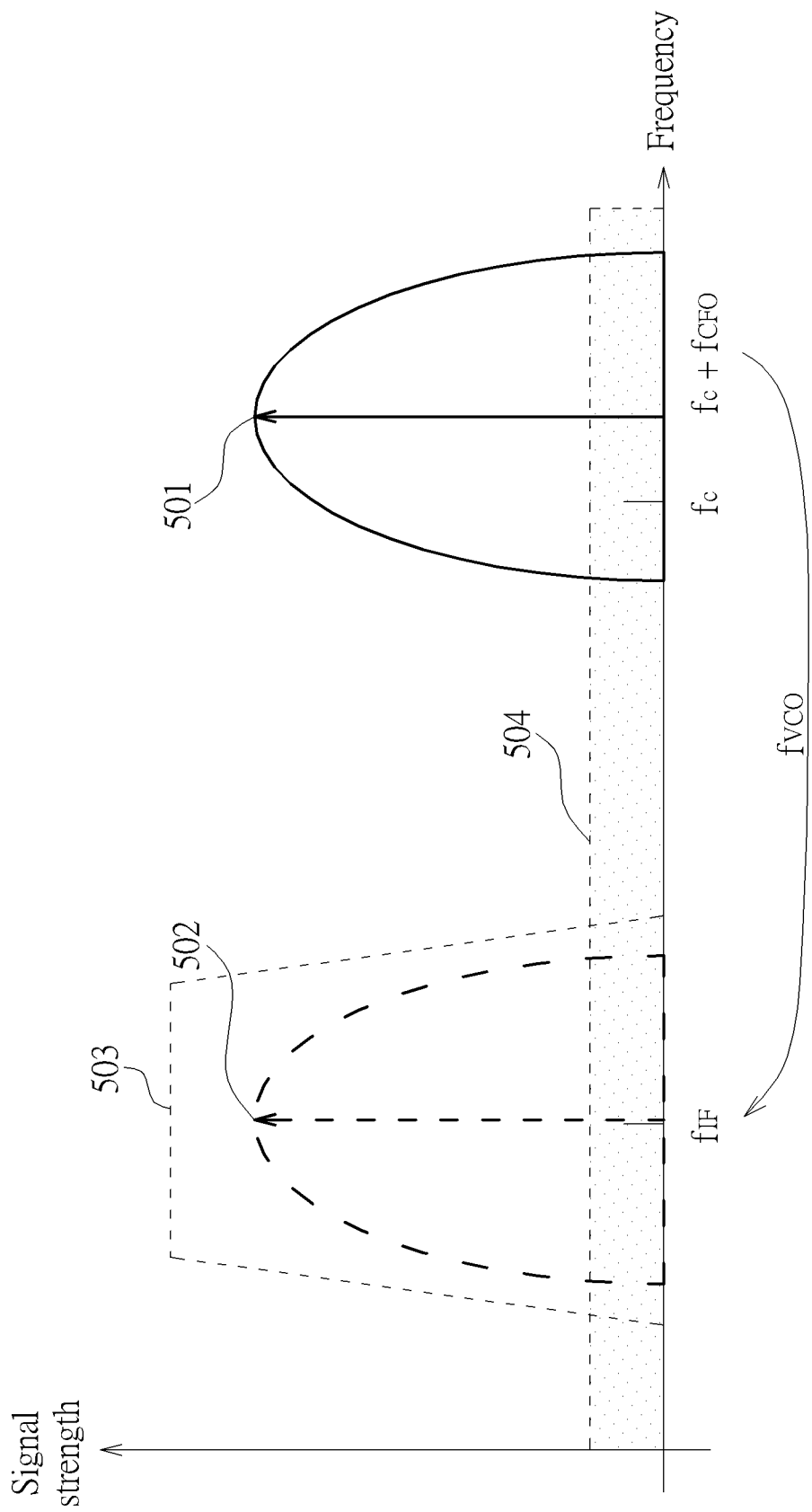
FIG. 5 shows a frequency response of the channel filter in FIG. 1 with a narrowed adjusted bandwidth under CFO effect with CFO compensation.

To better understand the CFO effect and the CFO compensation of the RF receiver 100, FIG. 3 to FIG. 5 are used to explain the concept of the present invention.

In FIG. 3, a solid curve 301 represents a spectrum of the RF signal Sc with a carrier frequency $f_c$ and the CFO $f_{CFO}$, a dash curve 302 represents a spectrum of the pair of I/Q signals $I_M$ and $Q_M$ before the CFO of the RF receiver 100 is compensated, a dash curve 303 represents a frequency response of the channel filter 132 with an optimized bandwidth for wanted signals, and an area 304 represents the background noise. In this case, the CFO of the RF receiver 100 is not compensated yet, and a part of wanted signal spectrum (i.e., an area below the curve 302) is out of the frequency response (i.e, an area below the curve 303) of the channel filter 132. Therefore, the wanted signal is distorted by the channel filter 132 under CFO effect since the CFO of the RF receiver 100 is not compensated yet.

Before the CFO of the RF receiver 100 is compensated, the channel filter 132 is initialized to have a bandwidth frequency response wider than the optimized bandwidth. In FIG. 4, a dash curve 403 represents the initialized bandwidth of the channel filter 132, a solid curve 401 represents a spectrum of the RF signal Sc with the carrier frequency $f_c$ and the CFO $f_{CFO}$, a dash curve 402 represents the spectrum of the pair of I/Q signals $I_M$ and $Q_M$ before the CFO of the RF receiver 100 is compensated, and an area 404 represents the background noise. In this case, the CFO is not compensated yet, and the wanted signal is not distorted by the channel filter 132 since the initialized bandwidth of the channel filter 132 is wider than the optimized bandwidth of the channel filter 132.

In FIG. 5, a solid curve 501 represents a spectrum of the RF signal Sc with the carrier frequency $f_c$ and the CFO $f_{CFO}$, a dash curve 502 represents a spectrum of the pair of I/Q signals $I_M$ and $Q_M$ after the CFO of the RF receiver 100 is compensated, a dash curve 503 represents a frequency response of the channel filter 132 after the CFO of the RF receiver 100 is compensated, and an area 504 represents the background noise. In this case, the CFO effect of the RF receiver 100 is estimated and compensated. The frequency response of the channel filter 132 represented by the dash curve 503 in FIG. 5 is narrower than the frequency response of the channel filter 132 represented by the dash curve 403 in FIG. 4, and the wanted signal is not distorted by the channel filter 132 since the spectrum of the pair of I/Q signals $I_M$ and $Q_M$ is shifted to be within the area below the dash curve 503 due to the CFO compensation of the RF receiver 100.

In an embodiment of the present invention, the bandwidth of the channel filter 132 is consisted of multiple sub-bandwidths. The bandwidth of the channel filter 132 may be narrowed by suppressing (e.g., by throttling) one or more of the sub-bandwidths of the channel filter 132. Similarly, the bandwidth of the digital low-pass filter 154 is consisted of multiple sub-bandwidths, and the bandwidth of the digital low-pass filter 154 may be narrowed by suppressing (e.g., by throttling) one or more of the sub-bandwidths of the digital low-pass filter 154.

Figure 6A:
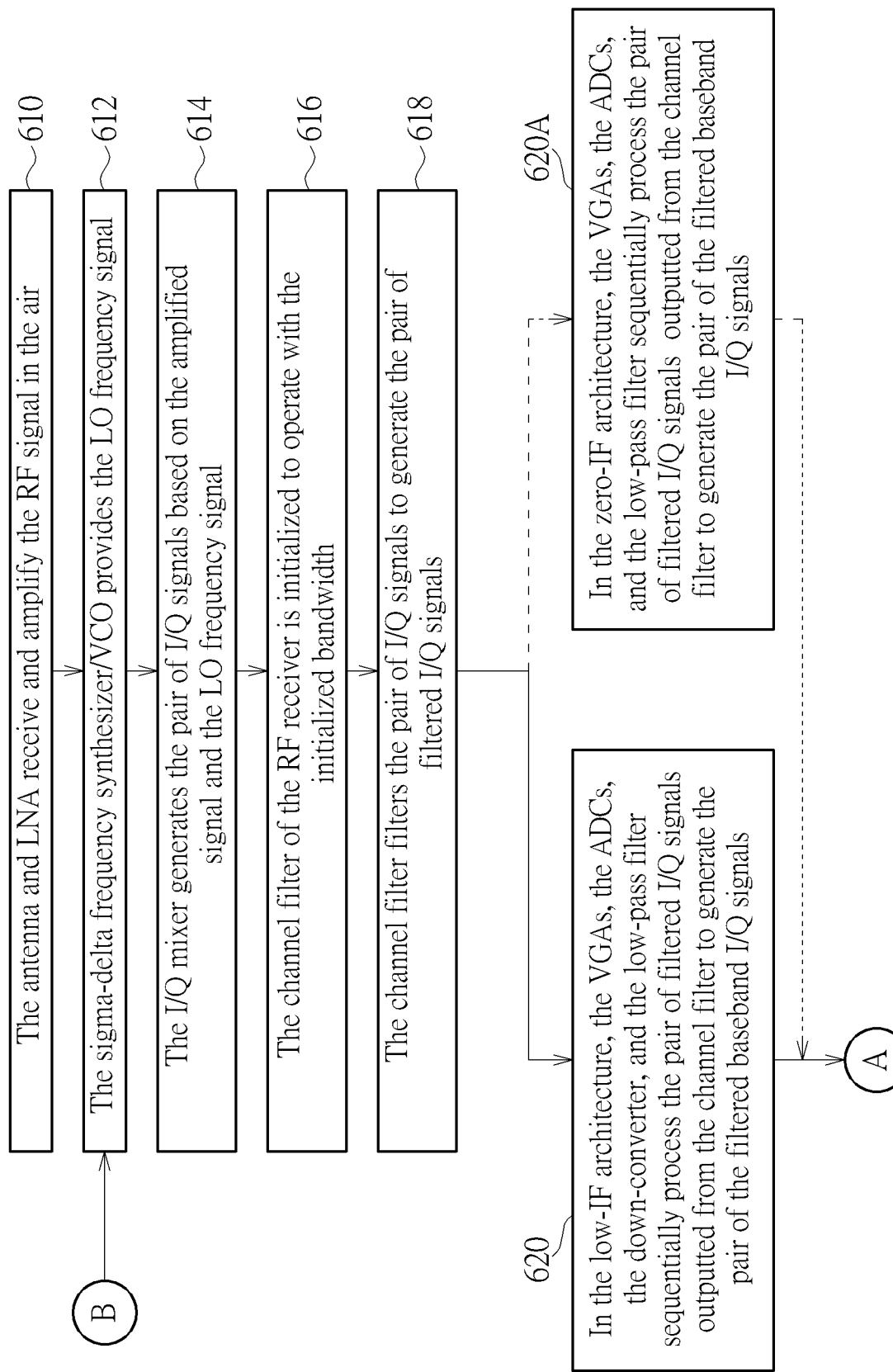
FIGS. 6A and 6B show a flow chart of the method for compensating the RF CFO and optimizing bandwidth of the receiver according an embodiment of the present invention.
Figure 6B:
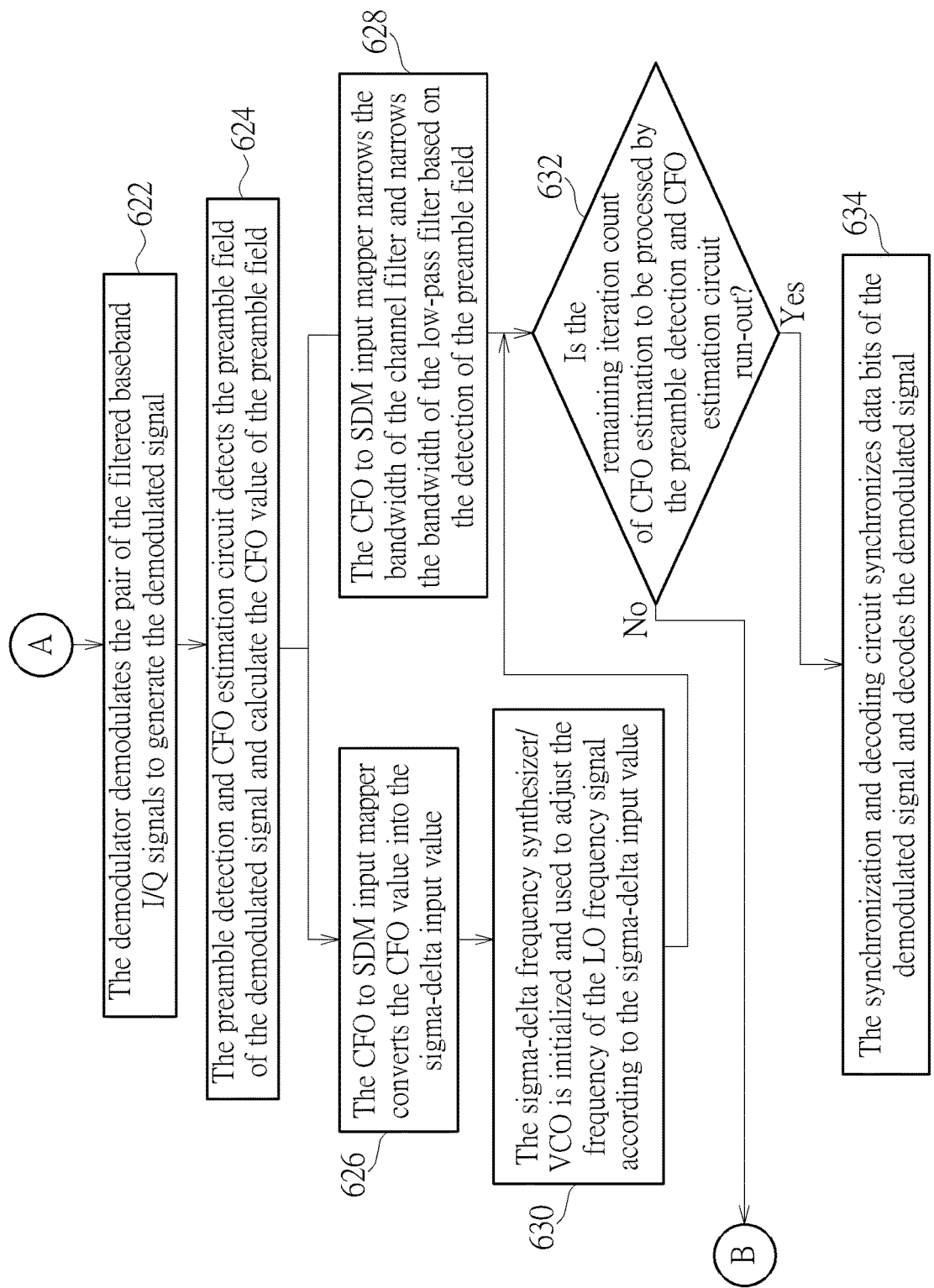

FIGS. 6A and 6B show a flow chart of the method for compensating the CFO and optimizing the bandwidth of the receiver according to an embodiment of the present invention. The method may comprise the following steps:

Step 610: The antenna 102 and the LNA 104 receive and amplify the RF signal Si in the air to generate the amplified RF signal Sc;

Step 612: The sigma-delta frequency synthesizer/VCO 110 provides the LO frequency signal $S_L$;

Step 614: The I/Q mixer 120 generates the pair of the I/Q signals $I_M$ and $Q_M$ based on the amplified RF signal Sc and the LO frequency signal $S_L$;

Step 616: The channel filter 132 of the RF receiver 100 is initialized to operate with the initialized bandwidth, which may be represented by the dash curve 403 in FIG. 4;

Step 618: The channel filter 132 filters the pair of the I/Q signals $I_M$ and $Q_M$ to generate the pair of the filtered I/Q signals $I_F$ and $Q_F$;

Step 620: In the low-IF architecture (e.g., the RF receiver 100 is a low-IF receiver), the VGAs 134, the ADCs 136, the down-converter 152, and the digital low-pass filter 154 sequentially process the pair of filtered I/Q signals $I_F$ and $Q_F$ outputted from the channel filter 132 to generate the pair of the filtered baseband I/Q signals $I_{LP}$ and $Q_{LP}$;

Step 622: The demodulator 156 demodulates the pair of the filtered baseband I/Q signals $I_{LP}$ and $Q_{LP}$ to generate the demodulated signal $S_{DE}$;

Step 624: The preamble detection and CFO estimation circuit 160 detects the preamble field of the digital demodulated signal $S_{DE}$ and calculate the CFO value S0 of the preamble field;

Step 626: The CFO to SDM input mapper 162 converts the CFO value S0 into the sigma-delta input value S1;

Step 628: The CFO to SDM input mapper 162 narrows the bandwidth of the channel filter 132 and narrows the bandwidth of the digital low-pass filter 154 based on the detection of the preamble field by the preamble detection and CFO estimation circuit 160;

Step 630: The sigma-delta frequency synthesizer/VCO 110 is initialized and adjusts the frequency $f_{VCO}$ of the LO frequency signal $S_L$ according to the sigma-delta input value S1;

Step 632: The receiver 100 determines whether the remaining iteration count of CFO estimation to be processed by the preamble detection and CFO estimation circuit is run-out. If the remaining iteration count of CFO estimation is not run-out, steps 612 to 630 would be repeated and the remaining iteration count of CFO estimation is decreased by 1. If the remaining iteration count of CFO estimation is run-out, step 634 would be executed; and Step 634: The synchronization and decoding circuit 166 synchronizes data bits of the digital demodulated signal $S_{DE}$ and decodes the digital demodulated signal $S_{DE}$ to output data contained in the received RF signal Si.

Since step 612 to step 630 can be repeated until the remaining iteration count of CFO estimation is run-out, a more reliable and accurate CFO value S0 can be obtained.

When the RF receiver 100 is a zero-IF receiver, step 620 would be replaced by step 620A since the down-converter 152 is unnecessary. In step 620A, the VGAs 134, the ADCs 136, and the digital low-pass filter 154 sequentially process the pair of filtered I/Q signals $I_F$ and $Q_F$ outputted from the channel filter 132 to generate the pair of the filtered baseband I/Q signals $I_{LP}$ and $Q_{LP}$.

Due to different required SNRs for the preamble field and the payload field of the digital demodulated signal $S_{DE}$, the preamble field of the digital demodulated signal $S_{DE}$ can be detected by the preamble detection and CFO estimation circuit 160 to estimate and compensate the CFO of the RF receiver 100. Moreover, before the CFO of the RF receiver 100 is compensated, the channel filter 132 is initialized to have a bandwidth frequency response wider than the optimized bandwidth of the channel filter 132. Therefore, the wanted signal would not be distorted by the channel filter 132 during the processes for compensating the CFO of the RF receiver 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio frequency (RF) receiver, comprising:
   an antenna;
   a low noise amplifier (LNA), configured to receive an RF signal from the antenna;
   a sigma-delta frequency synthesizer/voltage-controlled oscillator (VCO), configured to provide a local oscillator (LO) frequency signal;
   an in-phase and quadrature (I/Q) mixer, configured to generate a pair of I/Q signals based on the RF signal and the LO frequency signal;
   a channel filter, configured to filter the pair of the I/Q signals to generate a pair of filtered I/Q signals;
   a pair of I/Q variable-gain amplifiers (VGAs), configured to amplify the pair of the filtered I/Q signals to generate a pair of amplified I/Q signals;
   a pair of I/Q analog-to-digital converters (ADCs), configured to convert the pair of the amplified I/Q signals to generate a pair of digital I/Q signals; and
   a digital baseband circuit, comprising:
   a digital low-pass filter, configured to generate a pair of filtered baseband I/Q signals based on the pair of the digital I/Q signals;
   a demodulator, configured to demodulate the pair of the filtered baseband I/Q signals to generate a digital demodulated signal;
   a preamble detection and CFO estimation circuit, configured to detect a preamble field of the digital demodulated signal and calculating a CFO value of the preamble field; and
   a CFO to sigma-delta modulation (SDM) input mapper, configured to convert the CFO value into a sigma-delta input value, narrow a bandwidth of the channel filter, narrow a bandwidth of the digital low-pass filter based on the detection of the preamble field of the digital demodulated signal by the preamble detection and CFO estimation circuit, and adjust a frequency of the LO frequency signal according to the sigma-delta input value.

2. The RF receiver of claim 1, wherein the digital baseband circuit further comprises a down-converter configured to convert the pair of the digital I/Q signals into a pair of baseband I/Q signals; and
   wherein the digital low-pass filter is configured to filter the pair of the baseband I/Q signals to generate the pair of the filtered baseband I/Q signals.

3. The RF receiver of claim 1, wherein the digital low-pass filter is configured to filter the pair of the digital I/Q signals to generate the pair of the filtered baseband I/Q signals.

4. The RF receiver of claim 1, wherein the digital baseband circuit further comprises a data-path switch and a synchronization and decoding circuit, the CFO to SDM input mapper switches the data-path switch to pass the demodulated signal to the synchronization and decoding circuit of the digital baseband circuit, and the synchronization and decoding circuit synchronizes data bits of the digital demodulated signal and decoding the digital demodulated signal.

5. The RF receiver of claim 1, wherein when the RF receiver determines that a remaining iteration count of CFO estimation to be processed by the preamble detection and CFO estimation circuit is not run-out, the preamble detection and CFO estimation circuit re-calculates a new CFO value of the preamble field, the CFO to SDM input mapper converts the new CFO value into a new sigma-delta input value, the CFO to SDM input mapper narrows the bandwidth of the channel filter and narrows the bandwidth of the digital low-pass filter based on the new CFO value, and the sigma-delta frequency synthesizer/VCO readjusts the frequency of the LO frequency signal according to the new sigma-delta input value.

6. The RF receiver of claim 1, wherein the sigma-delta frequency synthesizer/VCO is pre-reset before passing the sigma-delta input value to the sigma-delta frequency synthesizer/VCO.

7. A method for simultaneously compensating a radio frequency (RF) carrier frequency offset (CFO) of an RF receiver and optimizing a bandwidth of the RF receiver, the method comprising:
   receiving, by an antenna and a low noise amplifier (LNA) of the RF receiver, an RF signal;
   providing, by a sigma-delta frequency synthesizer/voltage-controlled oscillator (VCO) of the RF receiver, a local oscillator (LO) frequency signal;
   generating, by an in-phase and quadrature (I/Q) mixer of the RF receiver, a pair of I/Q signals based on the RF signal and the LO frequency signal;
   initializing a channel filter of the RF receiver to operate with an initialized bandwidth;
   filtering, by the initialized channel filter, the pair of the I/Q signals to generate a pair of filtered I/Q signals;
   amplifying, by a pair of I/Q variable-gain amplifiers (VGAs) of the RF receiver, the pair of the filtered I/Q signals to generate a pair of amplified I/Q signals;
   converting, by a pair of I/Q analog-to-digital converters (ADCs) of the RF receiver, the pair of the amplified I/Q signals to generate a pair of digital I/Q signals;
   generating, by a digital low-pass filter of a digital baseband circuit of the RF receiver, a pair of filtered baseband I/Q signals based on the pair of the digital I/Q signals;
   demodulating, by a demodulator of the digital baseband circuit, the pair of the filtered baseband I/Q signals to generate a digital demodulated signal;
   detecting, by a preamble detection and CFO estimation circuit of the digital baseband circuit, a preamble field of the digital demodulated signal and calculating a CFO value of the preamble field;
   converting, by a CFO to sigma-delta modulation (SDM) input mapper of the digital baseband circuit, the CFO value into a sigma-delta input value;
   narrowing, by the CFO to SDM input mapper, a bandwidth of the channel filter and a bandwidth of the digital low-pass filter based on the detection of the preamble field of the digital demodulated signal by the preamble detection and CFO estimation circuit; and
   adjusting, by the sigma-delta frequency synthesizer/VCO, a frequency of the LO frequency signal according to the sigma-delta input value.

8. The method of claim 7, wherein the RF receiver is a zero inter-media frequency (zero-IF) receiver, and the channel filter is a low-pass type filter.

9. The method of claim 7, wherein the RF receiver is a low inter-media frequency (low-IF) receiver, and the channel filter is a band-pass type filter.

10. The method of claim 9, further comprising:
converting, by a down-converter of the digital baseband circuit, the pair of the digital I/Q signals into a pair of baseband I/Q signals;
wherein the digital low-pass filter filters the pair of the baseband I/Q signals to generate the pair of the filtered baseband I/Q signals.

11. The method of claim 7, further comprising:
switching, by the CFO to SDM input mapper, a data-path switch to pass the demodulated signal to a synchronization and decoding circuit of the digital baseband circuit;
synchronizing, by a synchronization and decoding circuit of the digital baseband circuit, data bits of the digital demodulated signal; and
decoding, by the synchronization and decoding circuit of the digital baseband circuit, the digital demodulated signal.

12. The method of claim 7, further comprising:
determining whether a remaining iteration count of CFO estimation to be processed by the preamble detection and CFO estimation circuit is not run-out; and
when it is determined that the remaining iteration count of CFO estimation is not run-out, executing following steps:
calculating, by the preamble detection and CFO estimation circuit of the digital baseband circuit, a new CFO value of the preamble field;
converting, by the CFO to SDM input mapper, the new CFO value into a new sigma-delta input value;
controlling, by the preamble detection and CFO estimation circuit, the CFO to SDM input mapper to narrow the bandwidth of the channel filter and narrow the bandwidth of the digital low-pass filter; and
readjusting, by the sigma-delta frequency synthesizer/VCO, the frequency of the LO frequency signal according to the new sigma-delta input value.

13. The method of claim 7, further comprising:
pre-resetting the sigma-delta frequency synthesizer/VCO before passing the sigma-delta input value to the sigma-delta frequency synthesizer/VCO.

* * * * *